June 26, 1962  J. B. SIMMONS  3,040,898

SETTLING AND SCREENING DEVICE FOR FLUID CONDUITS

Filed Nov. 16, 1959

INVENTOR
Joe B. Simmons

BY *Cecil C. Wood*

ATTORNEY

United States Patent Office 3,040,898
Patented June 26, 1962

3,040,898
SETTLING AND SCREENING DEVICE FOR FLUID CONDUITS
Joe B. Simmons, 639 Rice Drive, Andrews, Tex.
Filed Nov. 16, 1959, Ser. No. 853,072
3 Claims. (Cl. 210—312)

This invention relates to a settling and screening device for fluid conduits, and it concerns more particularly a settling and screening apparatus for installation in the suction lines of mud pumps such as those which are commonly employed in the oil fields.

An object of the invention is to provide a settling and screening unit for installation in the suction lines of mud pumps, for the purpose of continuously separating from a stream of mud, employed as drilling fluid, as a preliminary step preparatory to circulating the mud to and from a well bore in the process of being drilled, abrasive solid particles, such as sharp sandy and chert cuttings removed from the well bore, which are capable of damaging the pump, and larger particles, such as pieces of rubber, sticks, and other trash, which interfere with the operation of the pump valves, and sometimes plug the drilling bit.

Another object of the invention is to provide a settling and screening device for the purpose described which is characterized by its simple, rugged construction, is adapted to be fabricated inexpensively, and is efficient in operation and durable in use.

A still further object of the invention resides in the provision of a settling and screening unit in which the screen can be of any desired mesh, and interchangeable so that the unit can be installed in irrigation lines where water is pumped from surface ponds, streams, and the like, and in which the screen can be lowered to provide an open passage for fluids through the unit.

The invention will be readily understood by referring to the following description and the accompanying drawing, in which.

Figure 1:
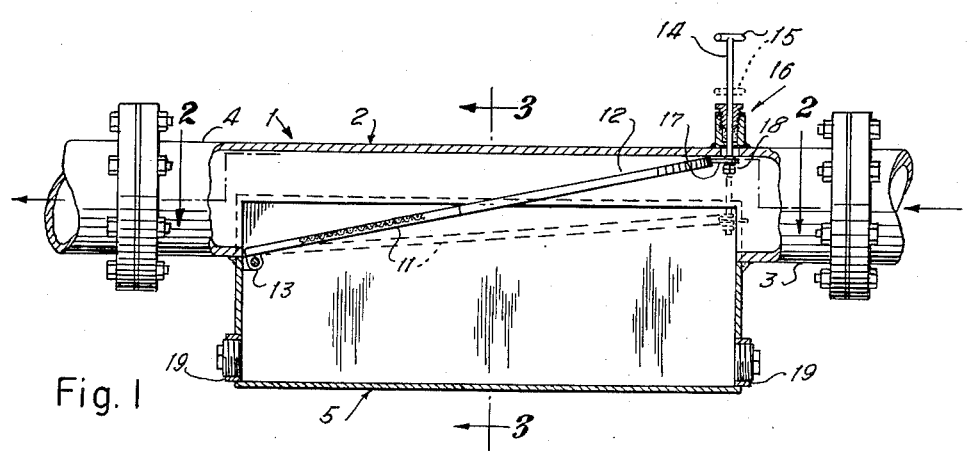
FIGURE 1 is a longitudinal elevational view, in partial section taken on a median line, of a settling and screening device embodying the invention.
Figure 2:
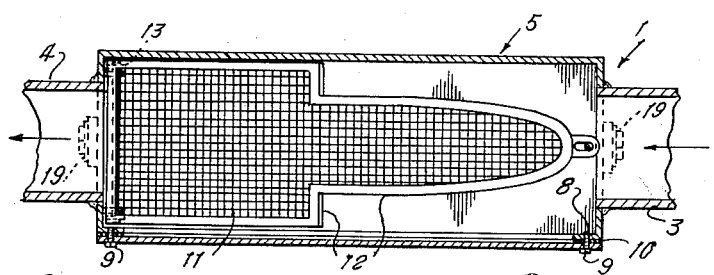
FIGURE 2 is a sectional plan view taken on the line 2—2 of FIGURE 1.
Figure 3:
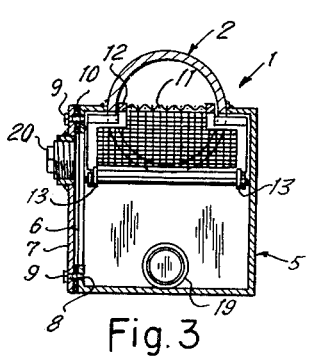
FIGURE 3 is a sectional elevational view taken on the line 3—3 of FIGURE 1.
Figure 4:
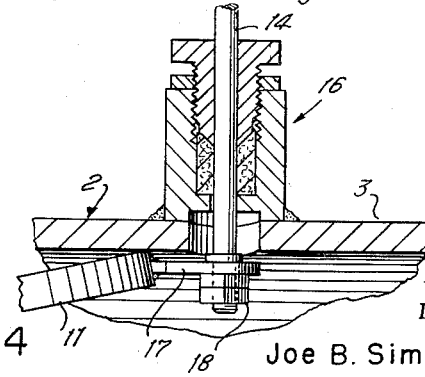
FIGURE 4 is a fragmentary enlarged sectional view of the screen-adjusting elements including the stuffing box therefor.

Referring to the drawing, the settling and screening device of the invention comprises a housing, which is indicated generally by the numeral 1. The housing 1 is formed in part by an elongated, normally horizontally disposed cylindrical element 2, which may consist of a piece of pipe. The cylindrical element 2 extends across the top of the housing 1, and the end portions thereof, which extend beyond the housing 1 and are adapted to be connected in a fluid conduit, form an inlet 3 and an outlet 4 in opposite ends of the housing 1.

The housing 1 further includes a generally rectangular box 5, of larger cross-sectional area than the cylindrical element 2, which is arranged longitudinally of the cylindrical element 2, intermediate its ends, and depends therefrom. Portions of the top and ends of the box 5 are cut away, whereby the box 5 conforms to the contour of the under side of the cylindrical element 2, to which the box 5 is joined by welding. Similarly, the underside of the cylindrical element 2 is cut away along its lines of juncture with the box 5.

The box 5 has an opening 6 therein which is substantially coextensive with one side thereof. The opening 6 is normally closed by a cover plate 7, which is removably secured to the adjacent side of the box 5 by studs 8 having nuts 9 applied thereto. A gasket 10 is disposed between the cover plate 7 and the adjacent side of the box 5.

A screen 11, which is of planar form and has a peripheral frame 12, is hinged at one end, as at 13, to one end of the box 5, immediately below the outlet 4.

The screen 11 is movable pivotally about its hinge 13 from an uppermost position, in which it is inclined longitudinally upwardly across the upper portion of the box 5 and the adjoining portion of the cylindrical element 2, which extends upwardly above the box 5, to a lowermost position in which the end of the screen 11 opposite the hinge 13 is positioned at a lower elevation, within the box 5 and between the longitudinal center line of the cylindrical element 2 and the bottom side thereof.

In its uppermost position the screen 11 extends diagonally across the upper portion of the box 1 and the adjoining portion of the cylindrical element 2, and in that position the outline of the peripheral frame 12 conforms to the contour of the adjacent interior surfaces of the box 5 and the cylindrical element 2.

A vertically disposed rod 14, which has a handle 15 on its upper end, is passed downwardly through an opening therefor in the top side of the cylindrical element 2, immediately adjacent the inlet 3, and extends into the interior of the housing 1. A stuffing box 16, which is positioned exteriorly of the cylindrical element 2, surrounds the rod 14 and the opening therefor in the cylindrical element 2.

An integral ear 17, which is formed on the end of the screen frame 12 opposite the hinge 13, has an opening therein through which the rod 14 is passed. A pair of nuts 18 are applied to the lower end of the rod 14, below the ear 17, whereby the adjacent end of the screen 11 is adapted to be suspended from the rod 14.

The screen 11 is adapted to be secured in either its uppermost or lowermost position by frictional engagement of rod 14 with the stuffing box 16, through which it is passed.

In the uppermost position of the screen 11, as shown in solid lines in FIGURE 1, drilling mud or other fluid, which may be flowing through a conduit in which the cylindrical element 2 is connected, enters the housing 1 through the inlet 3, and is caused to flow downwardly and forwardly therein, longitudinally of the box 5, wherein it is allowed to settle for a predetermined time interval, depending on the rate of flow through the cylindrical element 2 and the dimensions of the box 5 relative to the diameter of the cylindrical element 2. Thereafter a portion of the fluid is passed upwardly through the screen 11, and is discharged from the housing 1 through the outlet 4, and separated solids are collected in the box 5.

The diameter of the cylindrical element 5 preferably conforms to the diameter of the fluid conduit in which it is connected, so that substantially no settling occurs in the cylindrical element 5.

In the lowermost position of the screen 11, as shown in dotted lines in FIGURE 1, substantially free, unrestricted flow of drilling mud or other fluid through the cylindrical element 2 is permitted, while at the same time a partial settling and screening of the fluid is effected. At least a portion of the fluid passing through the cylindrical element 2, including most of the heavier components thereof, and components of large particle size, is caused to flow downwardly and forwardly through the settling box 5, below the screen 11, as above described.

The settling box 5 has removable plugs 19 in its ends, adjacent the bottom thereof, whereby the box 5 may be cleaned out. A removable plug 20 is provided in the side of the box 5 opposite the opening 6, below the screen 11, for use in cleaning the under side of the screen 11.

The invention may be modified in various ways without departing from the spirit and scope thereof.

What is claimed is:

1. A settling and screening device comprising a housing formed in part by an elongated, normally horizontally disposed cylindrical element, the cylindrical element extending across the top of the housing and having end portions extending beyond the housing and adapted to be connected in a fluid conduit, the end portions forming an inlet and an outlet in opposite ends of the housing, the housing further including a generally rectangular box, of larger cross-sectional area than the cylindrical element, arranged longitudinally of the cylindrical element, intermediate its ends, and depending therefrom, the box having portions of its top and ends cut away, whereby the box conforms to the contour of the under side of the cylindrical element, the box being joined to the under side of the cylindrical element and the under side of the cylindrical element being cut away along its lines of juncture with the box, and a screen, of planar form and having a peripheral frame, a hinge connecting one end of the screen to one end of the box, immediately below the outlet, and normally inclined longitudinally upwardly across the upper portion of the box and the adjoining portion of the cylindrical element, a vertically disposed rod, having a handle on its upper end, passed downwardly through an opening therefor in the top side of the cylindrical element, immediately adjacent the inlet, and extending into the interior of the housing, a stuffing box, positioned exteriorly of the cylindrical element, surrounding the rod and the opening therefor in the cylindrical element, and means pivotally connecting the lower end of the rod to the end of the screen frame opposite the hinge whereby the screen is movable pivotally about the hinge by vertical adjustment of the rod.

2. The structure of claim 1, the box having an opening therein substantially coextensive with one side thereof, and having a cover plate normally closing the opening and means removably securing the cover plate to the adjacent side of the box.

3. The structure of claim 2, the box having removable plugs in its ends and in the side thereof opposite the opening therein, for use in cleaning out the box and for cleaning the under side of the screen, respectively.

References Cited in the file of this patent

UNITED STATES PATENTS

| | | |
|---|---|---|
| 1,161,715 | Merrill | Nov. 23, 1915 |
| 1,367,449 | Akers | Feb. 21, 1921 |
| 1,508,041 | Winton | Sept. 9, 1924 |
| 1,552,902 | Werner | Sept. 8, 1925 |
| 2,644,585 | Ambrosi | July 7, 1953 |